Figure 1:
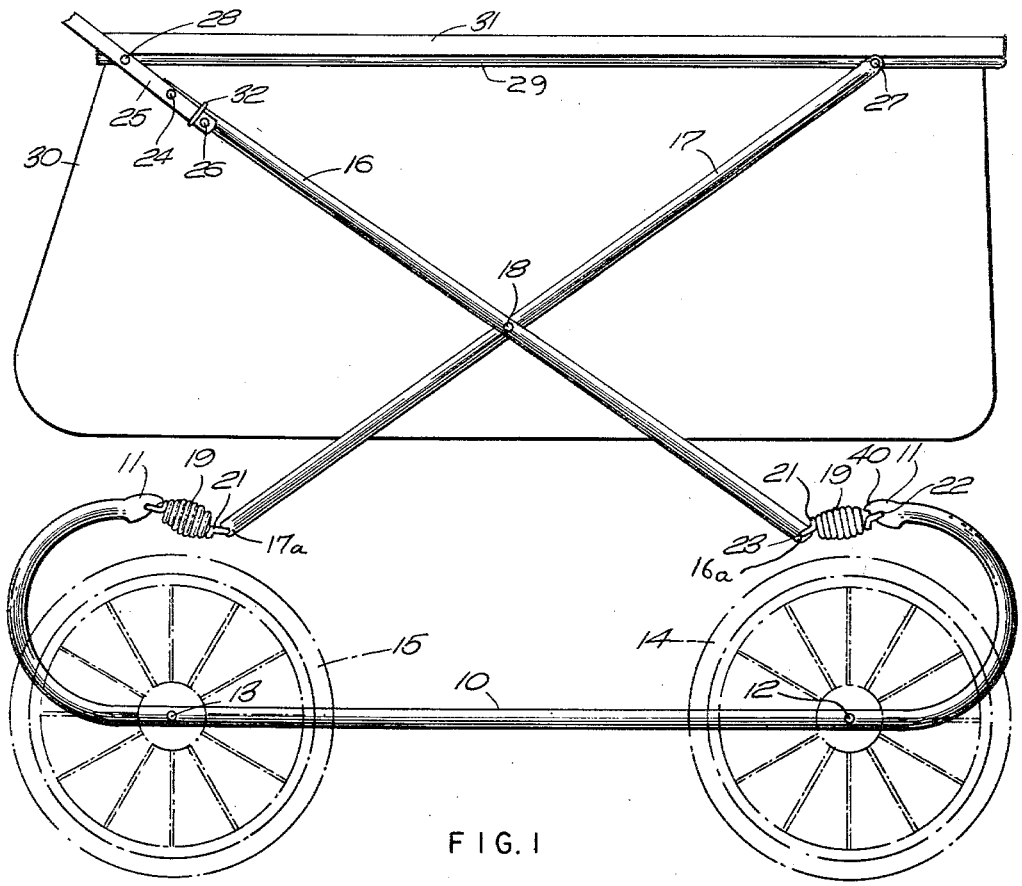

INVENTOR.
ALBAN M. BOUDREAU
BY
*Blair & Buckles*
ATTORNEYS

March 16, 1965  A. M. BOUDREAU  3,173,704
FOLDABLE BABY VEHICLE

Filed April 18, 1963  2 Sheets-Sheet 2

INVENTOR.
ALBAN M. BOUDREAU
BY
*Blair & Buckles*
ATTORNEYS

United States Patent Office 3,173,704
Patented Mar. 16, 1965

3,173,704
FOLDABLE BABY VEHICLE
Alban M. Boudreau, Gardner, Mass., assignor to
Hedstrom-Union Company, Fitchburg, Mass.
Filed Apr. 18, 1963, Ser. No. 273,957
6 Claims. (Cl. 280—36)

This invention relates to a foldable baby vehicle, and more particularly to a vehicle for transporting a baby in a sitting or reclining position. Vehicles of the type here concerned have upstanding seat carrying scissors frames resiliently supported on a wheeled bottom frame or undercarriage whereby an infant rider enjoys a smooth, jar-free ride. Usually the scissors frames are linked to the undercarriage by means of coil springs swingably connected and tensioned between the lower ends of the scissors frames and undercarriage, and the vehicles are folded by disengaging the upper ends of the scissors frames from the seat structure enabling the frames to open and thereby to collapse downwardly.

Heretofore, these baby vehicles suffered from excessive side-by-side swaying because the supporting springs were free to swing laterally as well as vertically about their fastening points in the scissors frames and undercarriage. Also when the rear handle provided for pushing the vehicle was raised up or depressed to tilt the vehicle over stairs, curbings and other obstructions, the lower ends of the scissors frames tended to swing on their respective springs, even though these were tensioned, a substantial distance about their fastenings to the undercarriage with the result that it was necessary to lift up or depress the pusher handle a considerable distance before the rear or front wheels respectively would even begin to lift off the ground. This "lost movement" of the pusher handle became even more pronounced when the springs extended under the rider's weight. Thus in normal situations, the operator was obliged to hunch over or stoop in order to depress the pusher handle enough to lift the front wheels of the loaded vehicle over even a relatively small obstacle.

Also when the prior vehicles were folded as aforesaid, the springs became untensioned, thereby loosening the scissors frames which tended to shift laterally with respect to the undercarriage sufficiently to cause the springs to lock or jam the vehicle in collapsed position, and thereby impede its return to the erect or normal operating position.

I have found that the aforementioned difficulties are overcome and the construction and operation of foldable baby vehicles of the type concerned greatly improved when the swinging and flexing movements of each supporting spring are restricted to a single vertical plane containing its fastening to the undercarriage, and more patricularly to only that portion of that plane as lies below said fastening.

With my invention baby vehicles are able to fold and unfold more easily because the supporting springs are locked against sideways pivoting movement with respect to the undercarriage even when the vehicles are fully collapsed. Further, my improved construction contributes a substantial amount of reinforcing and stabilizing strength to the vehicle, but does so without interfering with the downward flexing and expanding of said springs and hence without reducing the cushioning or buffering afforded the rider.

Figure 2:
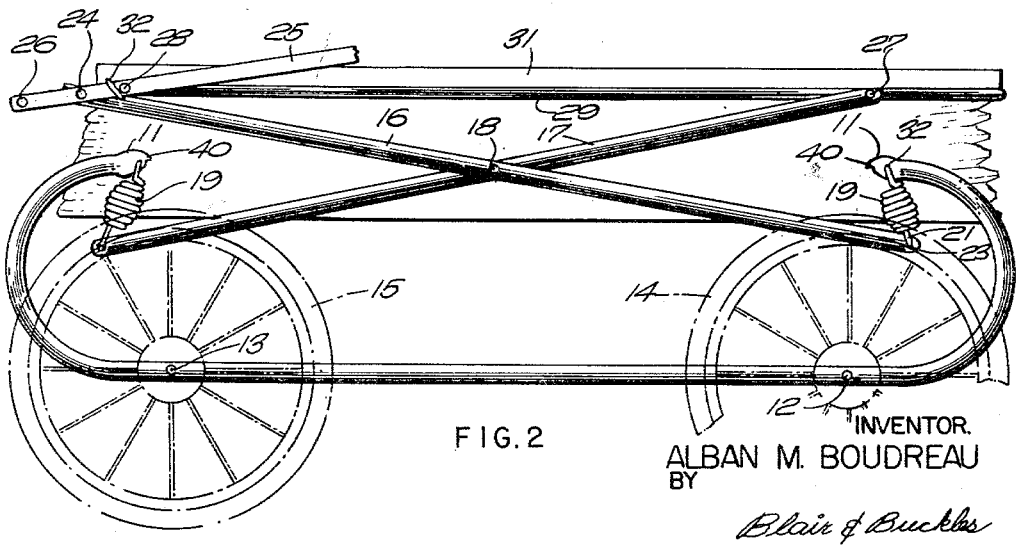
Figure 3:
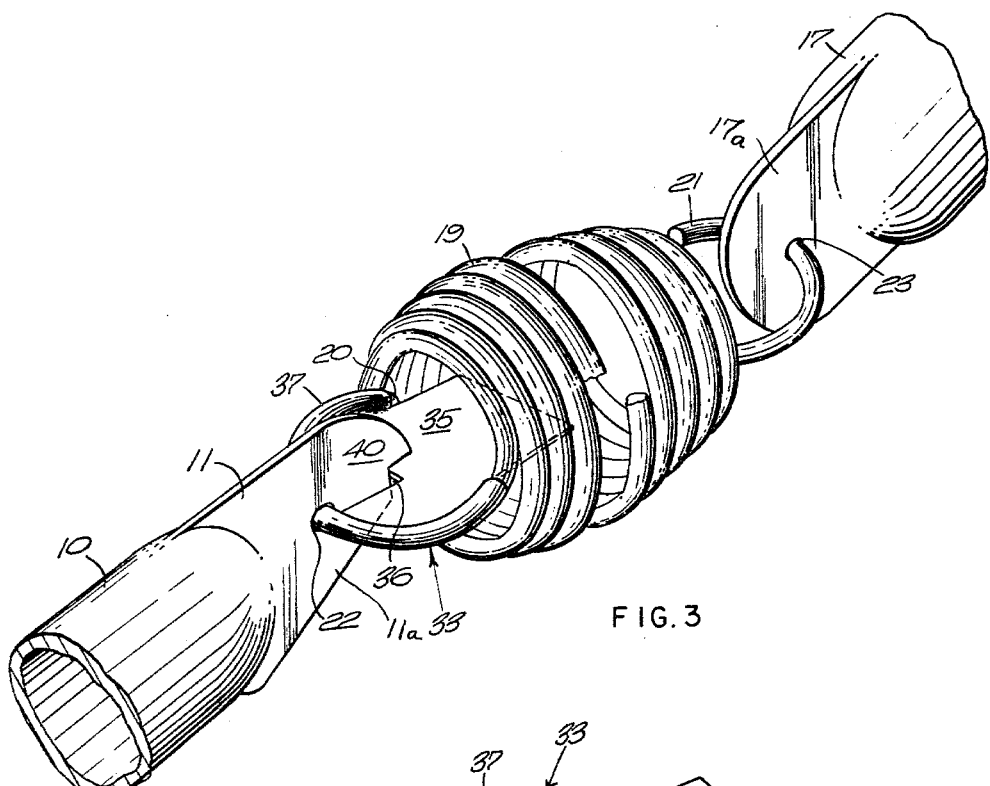
Figure 4:
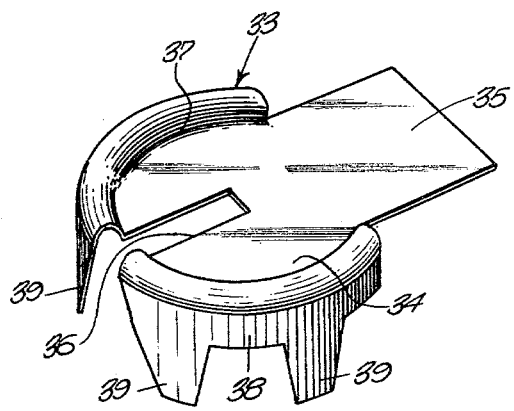

In the accompanying drawings:
FIG. 1 is a side elevation of my improved baby vehicle fully extended and with the pusher handle partially broken away;
FIG. 2 is a side elevation of the baby vehicle of FIG. 1 in its fully folded condition;
FIG. 3 is an enlarged perspective view of a portion of the apparatus of FIG. 1 showing the linkage between the undercarriage and the lower end of a scissors frame;
FIG. 4 is a perspective view of the stabilizing member of FIG. 3 on a larger scale and before its seating on the spring.

Referring to the drawings, my improved foldable baby vehicle comprises a pair of like spaced-apart, rigid undercarriage or bottom frame elements 10 located at opposite sides of the vehicle and having opposite inturned portions, terminating in flattened noses 11. Noses 11 have slanted bottom edges 11a for reasons to be described hereafter. A pair of transversely disposed front and rear axles 12, 13 having corresponding front and rear wheels 14, 15 at the opposite ends thereof are secured to the frame elements 10, intermediate their ends.

The invention vehicle comprises also duplicate side scissors frames each consisting of a pair of upstanding, crossed frame elements 16, 17 pivotally connected intermediate their ends at 18, and having flattened lower ends 16a, 17a respectively pivotally linked to corresponding nose portions 11 of the bottom frame elements 10 by means of springs 19. Springs 19 are of the conventional coil or, more preferably, barrel variety having opposite end loops 20, 21 hooking loosely through side openings 22 provided in the nose portions 11 and through side openings 23 in the ends 16a, 17a of the scissors frame elements 16, 17 respectively. The upper ends of frame elements 16 are themselves pivotally connected at 24 to the opposite arms of a U-shaped rearwardly curving handle member 25. The arms of member 25 are seen to extend beyond the pivot fastenings 24, and there to be fitted with side extending lugs 26 for reasons which will later become apparent.

A horizontal generally rectangular frame element or bail 29 is pivotally connected at its opposite sides through pins 27 to the upper ends of frame elements 17, and through pins 28 to the opposite arms of member 25 upwardly thereon from the pivotal connections 24. Bail 29 supports a conventional, vertically collapsible, optionally canopied carriage body or seating platform 30 having a peripheral overhang or flange 31 thereon engaging over the bail 29 as shown. Of course other conventional rider seating platforms such as those having a seat with or without leg openings and a back rest may be substituted without departing from the invention, and may be supported in the usual way from bail 29 in place of the particular body 30 illustrated herein.

When the instant vehicle is fully extended, the arms of member 25 lie parallel to frame elements 16, and the springs 19 are tensioned between the ends of bottom frame elements 10 and of scissors frame elements 16, 17 so that the scissors frames and seat are normally resiliently supported above the wheeled undercarriage. To maintain the vehicle in its aforesaid extended condition, slip rings 32 are provided on the arms of member 25 between pivotal connections 24 and 28 and these may be slid down on said arms to rest on the aforementioned lugs 26 and thus to engage over both frame elements 16 and the arms of member 25 whereby said arms become fixed with respect to and rigid extensions of frame elements 16 and whereby member 25 can function as a vehicle pusher handle. It will be appreciated from the foregoing also that the instant vehicle may be folded in the usual way for storage simply by disengaging slip rings 32 and swinging pusher handle 25 forwardly over bail 29 whereupon the scissors frame elements 16, 17 and body 30 collapse downwardly. As best seen in FIG. 2, as the vehicle collapses, the springs 19 become untensioned and the lower ends 16a, 17a of frame members 16, 17 swing down and hang loosely by their respective springs 19 from the bottom frame portions 11.

In accordance with my invention, stabilizing means indicated generally at 33 are provided for increasing substantially the stability in use of the instant vehicles by eliminating unwanted side to side swaying and swinging movements of the scissors frame elements 16, 17 and seat 30 relative to the wheeled undercarriage. The means 33 are adapted to engage over and seat on one end loop, say loop 20, of each spring 19 and are shown in the illustrated embodiment, FIGS. 3 and 4, to comprise each a rigid flat main body portion 34 corresponding to and slightly smaller than loop 20 having a generally rectangular laterally extending tongue or tab portion 35 which is slightly narrower than and adapted to be received into the end opening into spring 19.

The body portion 34 has formed therein a recess or slot 36 opposite tab 35, which is adapted to receive the portion of the flattened frame end 11a lying between opening 22 and the end of portion 11a. Mounted integrally with the curved edge of body portion 34 is an upwardly-outwardly rounded reinforcing lip or flange 37 the outer edge of which terminates in a downwardly extending skirt 38 which has, in turn, a series of spaced-apart depending tapered tabs or projections 39 distributed about its periphery.

It will be appreciated from the above that stabilizing means 33 can be seated easily on a loop 20 after the vehicle is otherwise fully assembled by sliding tab 35 into the end of spring 19 and pressing body portion 34 down onto loop 20 until the flange 37 engages over that loop. The skirt 38 and projections 39 are then bent inwardly under the loop to hold stabilizing means 33 firmly in place on loop 20. The aforementioned tapering of tabs 39 insures that when they are pressed around loop 20 and against the bottom of body portion 34, the tabs 39 do not overlap and lie out of the way of frame portion 11 and flat against the bottom portion of 34. When so arranged tabs 39 will be understood also to reinforce stabilizing means 33 so that portion 34 does not bend even under a relatively large downward force applied against its top face.

As mentioned previously, slot 36 is just large enough to receive the flattened frame portion 11a within loop 20 so that spring 19 can swing only vertically about its pivot at 22 relative to its corresponding bottom frame 10. That is, the relative sliding or swinging movements laterally of the spring 19 with respect to frame portion 11 or in the plane of loop 20 are prevented by the engagement of frame portion 11 with the sides of recess 36. By preventing the sideways sliding and pivoting of spring 19, stabilizing means 33 thus substantially reduces the side-to-side swaying of, without affecting the cushioning afforded, the rider.

Further in accordance with the invention, stabilizing means 33 reduce even more the sidewise swinging movements of the vehicle body by controlling the lateral flexing of the corresponding springs 19. More particularly, the aforementioned tongue extension or tab 38 extending into a spring 19 engages the inside surfaces of the spring coils near the end loop 20 whenever these coils are displaced laterally appreciably from their normal unflexed position. Since spring 19 is preferably barrel shaped, it will be understood that the tab 35 engages these spring coils successively. That is, as spring 19 is flexed to one side, tab 35 engages the coil adjacent loop 20. If the flexing continues in the same direction, the tab then engages the second coil in from loop 20, and so on. Resultantly, as spring 19 is flexed or bent laterally, it is increasingly damped or made increasingly resistant to further flexing or bending in the same direction. Of course in the case of the straight cylindrical spring, the same result would be produced by making tab 35 tapered toward its end. In any event, the stabilizing means 33 is seen to substantially eliminate the side-to-side swaying of the vehicle body relative to the wheeled undercarriage. Moreover this is accomplished gradually and smoothly, rather than jarringly, due to the aforementioned gradient damping effected by tap 35. It will be understood also that stabilizing element 33 does not interfere with or hinder the longitudinal expanding and vertical flexing of spring 19 and so does not reduce the cushioning afforded by the instant vehicles because tab 35 is flat and arranged horizontally within the rounded spring so that the spring coils are free to slide lengthwise as well as vertically relative to the tab.

In addition to stabilizing the instant vehicles in use, means 33 also prevents them from locking or jamming in the folded position because spring loops 20 cannot become displaced laterally relative to their corresponding frame portions 11 and thereby to jam the pivotal connections at 22, 23. Thus when my carriage is folded as aforesaid, the upper frame members 16, 17 and seat 30 always collapse vertically downward, and when in the fully folded position of FIG. 2 the bottom ends of frame members 16, 17 are suspended by their untensioned corresponding springs 19 directly below, as opposed to either side of, their corresponding bottom frame portions 11.

Further in accordance with the invention, the tilting over stairs, curbings, or other road obstructions of the front or rear wheels of the instant vehicles by manipulating the pusher handle 25 and overall vehicle maneuvering are greatly facilitated by means of a protruding overhanging nose or detent 40 mounted at the end of each bottom frame portion 11a and which coacts with its aforementioned corresponding stabilizing means 33 to confine the movements in the single vertical plane containing its pivotal connection to the frame element 10 of its associated spring 19 to that portion of that plane as lies below that connection. More particularly, whenever a spring 19 is pivoted appreciably above its connection at 22 to bottom frame 10, the corresponding detent 40 will engage the corresponding stabilizing element 33 and thereby prevent the further upward pivoting movement of that spring.

Resultantly, with relatively little downward motion of the pusher handle the instant vehicle can be tilted back on its rear wheels to lift the front wheels over an obstruction. The scissor frame elements 17 and their springs 19 are free to pivot upwardly only slightly about their pivotal connections at 22, or until the detents 40 engage their corresponding stabilizing elements 33. Thereupon the front wheels lift off the ground, the springs 19 being of sufficient stiffness to support the elevated portion of the wheeled undercarriage. Similarly, the rear wheels 14 of the vehicle may be raised off the ground by a relatively small upward movement of the pusher handle 25. The operator is thus able to maneuver by manipulating the handle 25, the instant vehicle more quickly and efficiently over stairs, curbs, and other obstructions and without the necessity of bending or stooping to any appreciable degree even when the vehicle is fully loaded.

It will be appreciated from the foregoing that my vehicle construction also greatly reduces the undesirable roll and pitch motions usually found in vehicles of this type. Yet the shock absorbing and cushioning afforded the rider are not reduced since the springs 19 are still able to flex upwardly for bringing the scissors frames 16, 17 and seat 30 to a gradual and cushioned, as opposed to a sudden, jarring, stop when detents 40 engage the stabilizing elements 33.

It will be appreciated also that although the illustrated embodiment shows stabilizing means seated on the tops of spring loops 20, the same results are obtained if means 33 are seated on the bottom of spring loops 21, and detents 40 are mounted on the lower ends of frame members 16, 17 and so as to engage from below their corresponding stabilizing means 33. This is easily visualized by an end-to-end rotation of FIG. 3.

My invention is not limited to the particular embodiments thereof illustrated and described herein, and I set forth its scope in my following claims.

I claim:

1. A foldable baby vehicle comprising: an undercarriage; a pair of upstanding scissors frames; a pusher handle; seating means suspended between said scissors frames near the upper ends thereof; first spring attaching formations on the lower ends of said scissors frames; second spring attaching formations on front and rear portions of said undercarriage; springs swingably connected between said first and second formations for resiliently supporting said seating means above said undercarriage, one of said first and second formations including corresponding noses protruding out beyond said connections between said springs and said undercarriage extending toward corresponding ones of said springs; laterally disposed plates mounted on a plurality of said springs, said plates extending below said noses, corresponding ones of said plates and said noses being arranged and adapted to engage one another and thereby to prevent their relative movement vertically in one direction whenever a corresponding one of said plurality of springs swings above its connection to said undercarriage.

2. A foldable baby vehicle comprising: an undercarriage; a pair of upstanding scissors frames; a pusher handle; a seating platform suspended between said scissors frames near the upper ends thereof; first spring attaching formations on the lower ends of said scissors frames; second spring attaching formations on front and rear portions of said undercarriage; coil springs swingably connected between said first and second formations for resiliently supporting said seating platform above said undercarriage, said springs having first end loops hooking through said first formations whereby portions of said first formations extend within said first loops and second end loops hooking through said second formations whereby portions of said second formations extend within said second loops; stabilizing means mounted on one loop of one of said springs, said stabilizing means having a slot extending inwardly from one side thereof parallel to the longitudinal axis of said one of said springs for snugly receiving for vertical swinging movement only the spring attaching formation portion extending within said one loop.

3. A foldable baby vehicle as defined in claim 2 wherein said spring attaching formation extending within said one loop includes a protruding nose portion, said nose portion being arranged and adapted to engage and thereby to limit the vertical movements of said stabilizing means whenever said one of said springs swings above its connection to said undercarriage.

4. A foldable baby vehicle comprising: an undercarriage; a pair of upstanding scissors frames; a pusher handle; seating means mounted between said scissors frames near the upper ends thereof; first spring attaching formations on the lower ends of said scissors frames; second spring attaching formations on front and rear portions of said undercarriage; barrel springs swingably connected to said first and second formations whereby said seating means is resiliently suspended above said undercarriage, said springs having first end loops swingably connected to said first formations and second end loops hooking through said second formations whereby portions of said second formations extend within said second loops; stabilizing means mounted on said second loops, each said stabilizing means having a slot extending inwardly from one side thereof and parallel to the longitudinal axis of its corresponding spring for snugly receiving for vertical swinging movements only the second formation portion extending within the second loop of said corresponding spring, said stabilizing means having also a tongue portion extending into said corresponding spring, said tongue portion being arranged and adapted to engage the coils of said spring successively when said spring is flexed sideways thereby to damp the sidewise swinging movements of said seat.

5. A foldable baby vehicle as defined in claim 4 wherein said second formations include corresponding detents, said detents being arranged and adapted to engage and thereby to limit the vertical movements of corresponding ones of said stabilizing means whenever corresponding ones of said springs swing above said connections to said undercarriage.

6. A foldable baby vehicle comprising: an undercarriage; a pair of upstanding scissors frames; a pusher handle; seating means mounted between said scissors frames near the upper ends thereof; first spring attaching formations on the lower ends of said scissors frames; second spring attaching formations on front and rear portions of said undercarriage; coil springs swingably connected between said first and second formations whereby said seating means is resiliently supported above said undercarriage, said springs having first and second end loops swingably connected to said first and second formations respectively, each of said formations having a portion extending within its corresponding loop; stabilizing means mounted on one loop of at least one of said springs, said stabilizing means having a generally semicircular flat portion arranged to fit within said one loop, the curved edge of said stabilizing means portion terminating in a depending flange adapted to engage over and be turned under said one loop whereby to rigidly secure said stabilizing means to said one loop, said stabilizing means having also a slot extending from one side thereof parallel to the longitudinal axis of said one spring for snugly receiving for vertical swinging movements only the formation portion extending within said one loop, said formation portion including a detent overhanging said stabilizing means portion, said detent being arranged and adapted to engage said stabilizing means portion and thereby to limit its vertical movement whenever said one spring pivots about its connection to said undercarriage.

References Cited by the Examiner
UNITED STATES PATENTS 2,744,760  5/56  Welsh et al. _____ 280—36
2,972,488  2/61  Alsop _____ 280—36 X

FOREIGN PATENTS 611,921  11/48  Great Britain.

ARTHUR L. LA POINT, *Primary Examiner.*